Oct. 10, 1944. H. R. GREENLEE 2,360,124
FLUID COUPLING
Filed July 3, 1941
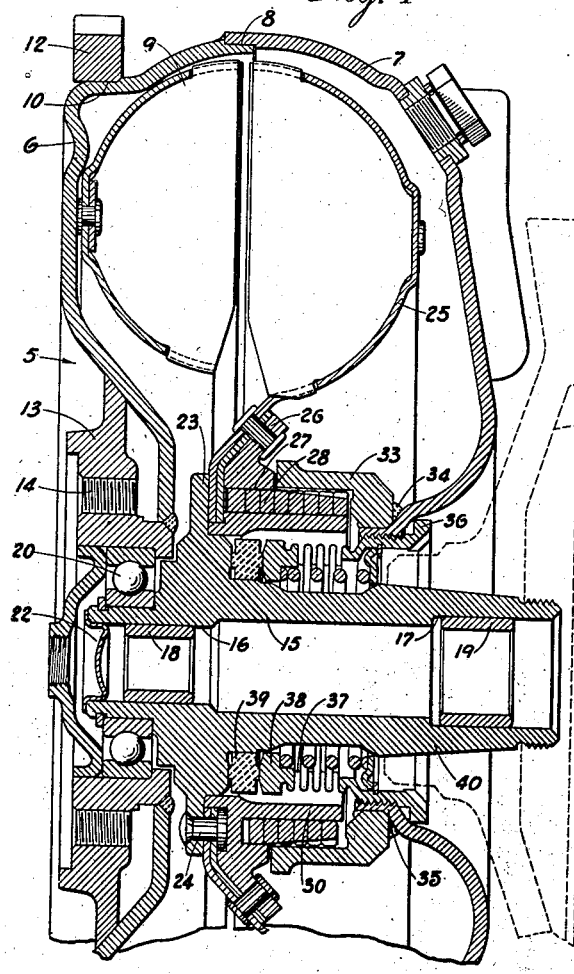
INVENTOR
Harry R. Greenlee
BY Walter E. Schirmer
ATTORNEY Patented Oct. 10, 1944

2,360,124

UNITED STATES PATENT OFFICE 2,360,124

FLUID COUPLING

Harry R. Greenlee, South Bend, Ind., assignor to The Studebaker Corporation, South Bend, Ind., a corporation of Delaware Application July 3, 1941, Serial No. 400,953

11 Claims. (Cl. 192—3.2)

This invention relates to fluid couplings and more particularly is directed to a fluid coupling construction for use in automobiles or the like in which means is provided for automatically locking up the coupling for direct drive under predetermined speed conditions.

It has been found, through considerable experimentation and tests of fluid coupling drives, that after a speed of ten miles per hour has been reached there is little or no necessity for employing a fluid coupling in the drive. Consequently, above this speed the coupling merely produces slippage and reduces the effective torque transmission from the power source to the transmission. This, in turn, produces additional heat which must be dissipated, as well as increasing the load on bearings and reducing the mileage per unit of consumption of fuel.

It is therefore a primary object of the present invention to provide a fluid coupling which may be fully effective to cushion the transmission of power from the engine to the gear train throughout the low speed range of the vehicle where such a coupling is most essential, which coupling, however, is provided with self-contained means which will automatically lock the rotor to the impeller for conjoint rotation when a predetermined speed has been reached. This lock-up is effected independently of any control on the part of the operator and is responsive to speed conditions as sensed by the driven member connected to the power train of the vehicle.

In a preferred form of the present invention I provide as a means of locking up the fluid coupling a coil spring clutch which is so arranged that it will be centrifugally actuated under predetermined speed conditions to expand into coupling engagement for locking the rotor to the impeller in a one-to-one direct drive. This immediately cuts out the slippage within the coupling and, of course, immediately produces a direct drive therethrough which as a consequence produces gas saving and eliminates the constant heating of the fluid in the coupling with the consequent elimination of any means necessary for cooling such fluid. At the same time, the elimination of this heat allows more effective lubrication of the drive shaft gear bearings and also eliminates the necessity of providing a pop-off valve or the like for relieving excess pressure within the coupling since the coupling never reaches a speed when employed in a coupling capacity sufficient to build up a pressure which might have to be relieved.

I have found that with such a construction there is a very material saving in fuel consumption since the elimination of slippage in the coupling after the predetermined speed has been reached greatly reduces the amount of fuel consumed as compared to drives in which the fluid coupling is at all times operative and is producing slippage throughout the complete operating range of the vehicle.

Other objects and advantages of the present invention will appear more fully from the detailed description which, taken in conjunction with the accompanying drawing, will disclose to those skilled in the art the particular construction and operation of a preferred form of the present invention.

In the drawing:

Figure 1 is a vertical sectional view through a fluid coupling embodying the present invention;

Figure 2 is a detail sectional view showing a modified way of producing centrifugal action of the locking clutch;

Figure 3 is a sectional view taken substantially on line 3—3 of Figure 2;

Figure 4 is a detail view of the centrifugal actuator shown in Figures 2 and 3;

Figure 5 is an elevational view of a further form of clutch construction which may be employed for locking up the fluid coupling;

Figure 6 shows a modified sectional view of another actuating means for the spring clutch;

Figure 7 is a sectional view taken substantially on line 7—7 of Figure 6;

Figure 8 is a further modification of the structure shown in Figures 1, 2 and 6; and Figure 9 is a modification showing the clutch in a reversed operating position.

Referring now in detail to the drawing, in Figure 1 I have disclosed at 5 the fluid coupling housing consisting of the stampings 6 and 7 which I secure together by overlapping of the peripheral portions 8 to form an enclosing torus shaped housing. Secured to the stamping 6 internally of the housing is the impeller member 9, which may be of any desired form, and secured about a shoulder 10 on the stamping 6 is the ring gear 12 forming a starting gear for the engine of the vehicle in which the coupling is employed.

The coupling housing 5 is rigidly secured to a ring member 13 which is tapped as at 14 to receive suitable studs for securing the same to the flanged end of the engine crank shaft whereby the housing, including the impeller 9, is directly coupled to the engine crank shaft. Disposed within and extending axially of the housing 5 is the quill or sleeve shaft 15 which has formed therein the bearing seats 16 and 17 receiving the bearings 18 and 19 for rotatably mounting the drive gear and its associated shaft therein. The sleeve 15 at its forward end is journalled by means of the ball bearing assembly 20 in the hub portion of the ring member 13, whereby it is centered axially with respect to the crank shaft of the engine, and a suitable closure cap 22 closes the forward end of the sleeve 15 to prevent passage of the lubricant thereinto from the bearings 20.

The sleeve 15 is provided with the radially extending flange 23 upon which is mounted, by means of suitable rivets 24, the rotor or driven member of the coupling indicated generally at 25. The rotor member 25 has secured to it the annulus or ring member 26 which is arranged to provide an annular channel 27 therein adapted to receive the coiled spring member 28, one end of this spring member as indicated in Figure 5 being turned at right angles, as at 29, for locking engagement in the ring member 26. The ring member 26 has an axially extending hub portion 30 upon which the spring 28 is normally carried. Overlying this extended hub portion 30 in radially spaced relationship thereto to form a continuation of the channel 27 is the clutch sleeve member 33 welded as at 34 to the inner peripheral portion 35 of the housing 5. This inner peripheral portion 35 of the housing is internally threaded to receive the bushing 36 which carries at its inner end one end of the flexible bellows member 37, the opposite end of said bellows carrying the ring 38 bearing against the bearing ring 39, this being a more or less conventional oil sealing arrangement for preventing leakage of fluid from within the coupling outwardly along the external surface of the sleeve 15.

The sleeve 15 is provided with a tapered end portion 40 upon which is adapted to be mounted the clutch plate indicated by dotted lines at 42, forming one element of the friction clutch for the vehicle.

In the operation of the construction thus far described, it will be apparent that upon operation of the engine the housing 5 will be rotated which, in turn will rotate the impeller member 9, causing circulation of fluid within the coupling. As a result, the rotor 25 is urged into rotation which, in turn, transmits driving torque through the sleeve 15 and the clutch plate 42 to the drive gears of the vehicle. It will be apparent that due to slippage within the coupling there will be relative rotation between the ring member 26 which carries the spring 28 and the sleeve 33 carried by the clutch housing. Within a predetermined maximum speed the spring 28 will lie in a position such that it does not contact the internal cylindrical surface of the sleeve 33. However, as a predetermined speed is reached the free end of the spring 28, which is shown as at the right-hand end of the spring, is radially expanded by centrifugal force and operates to frictionally engage this internal annular surface of the sleeve 33, whereby the spring and sleeve are frictionally locked together. This, in turn, locks the rotor 25 for conjoint rotation with the sleeve 33, thereby eliminating the slippage in the coupling and producing a direct drive therethrough.

While the predetermined speed at which such locking up occurs can be varied, I have found that the characteristics of a fluid coupling are such in passenger car installations, for example, that above a speed of ten miles per hour of the vehicle there is no necessity for employing the fluid coupling as its characteristics above that speed produce no essential advantages in the operation of the vehicle. Consequently, the spring 28 is so designed that it will frictionally engage the sleeve 33 at this speed and consequently will lock the coupling out of operation at all speeds above this predetermined speed. It is to be understood, however, that there is a range of speed which may be from two to three miles per hour which may be effective to hold the spring in engagement with the sleeve 33 so that there will be no tendency for an intermittent coupling action, hence when the spring has once engaged the sleeve 33 it will remain locked thereto until the speed has been reduced a predetermined amount below the ten miles per hour.

In the construction shown in Figures 2 to 4 the ring 26 carries the spring 28 in substantially the same manner as previously described. However, the sleeve 33 in this form of the invention, which is secured to the coupling housing 5, is provided with radially directed lug portions 50 at circumferentially spaced points thereon carrying the transversely projecting pins 52 upon which are mounted the centrifugally actuated members 53. The members 53 have weighted outer end portions 54 and at the inner ends are provided with rounded cam surfaces 55 adapted to bear against an annular washer 56 which is axially slidable on the extended hub portion 30 of the ring 26. The washer 56 is adapted to have frictional contact with the radial face of an adjacent ring 57 which, in turn, is related to the free end coil of the spring 28 in such manner that the frictional drag produced between the rings 56 and 57 will, in turn, produce radial expansion of the outer end of the spring 28, consequently enlarging this spring so that it clamps to the internal annular surface of the sleeve 33. The weighted ends 54 of the lever 53 are so designed that they produce this frictional drag at a predetermined speed of housing 7 thereby operating the spring clutch at this speed to lock the rotor directly to the impeller.

In Figures 6 and 7 I have covered a still further modified arrangement for actuating the spring. In this form of the invention the member 26' is secured to the hub portion of the rotor carrying the spring 28 in the same manner as previously described. However, the sleeve 33' in this form of the invention is modified in that it is bored out to receive an annular ring member 59 which ring member is keyed against rotation by means of the pin 60. The ring member 59 is provided with a ball retaining surface 62 within which are retained a circumferential series of ball members 63. Normally, the ring member 59 is urged axially outwardly against the radial flange portion of the sleeve 33' by means of a small spring 64. The opposite radial face of the ring member 59 is adapted to have frictional engagement against the radial surface of the annular washer 65 which, in turn, is operatively associated with the free end of the spring 28. In operation with this construction, as the speed of rotation of member 7 increases, the balls 63 tend to move radially outwardly along the cam surface 62, thereby urging the coupling ring member 59 axially to the left. At a predetermined point in the speed range the member 59 engages the washer 65 producing a frictional drag thereon which, in turn, is transmitted to the spring 28 to enlarge the free end of this spring radially so that it is frictionally clutched to the internal annular surface 66 of the sleeve member 33'. This couples the member 26' and the sleeve member 33' together for conjoint rotation, thereby connecting the coupling and the rotor direct to the fluid coupling housing.

In Figure 8 I have shown a modification of the construction which allows easy assembly and disassembly of the component parts of the lockup clutch. In this form of the invention the ring member 26 carries the spring 28 in the usual manner. However, the housing part 7' which is a modification of the stamping 7 of Figure 1 is provided with a radially inwardly directed flange portion to which is secured, by means of the stud bolts 70, a first cylindrical sleeve member 72 having the radial flange portion 73 receiving the inner ends of the studs 70. A correspondingly shaped second ring or sleeve member 74 has its radial flange portion 75 clamped to the outer face of the flange of the housing 7' by means of the studs 70, a suitable sealing ring 76 being interposed therebetween. The cylindrically extending portion 77 of the member 74 telescopes over the extended end portions 30 of the member 26 and forms an internal annular surface 78 to which the spring 28 may be clutched.

In this construction a teaser spring 79 is employed which spring is of light weight and when centrifugally actuated first clutches itself to the surface 78 and then functions to actuate the free end of the main spring 28 for radially expanding the same into clutching engagement with the member 74.

It will be apparent that with the construction shown in Figure 8, removal of the studs 70 allows removal of the member 74 and, consequently, allows access to the springs 28 and 79 as well as allowing the free removal of the sealing means provided by the bellows 37 and sealing rings 38 and 39. This facilitates both assembly and disassembly of the lockup structure for easy inspection and maintenance.

In Figure 9 there is disclosed a construction in which the friction clutch spring is carried by the impeller housing and is adapted to frictionally clutch to the rotor member thereby providing reversed clutching action. In this construction the inner hub portion of the rotor 25 is adapted to receive the member 80 which is suitably tapped as at 82 for receiving screws by which the rotor 25 may be secured thereto. The member 80 is provided with a cylindrical portion 83, having the inner annular clutch surface 84. In this construction the stamping 7 of the impeller 7' has secured thereto the sleeve member 85, being provided with the extended hub portion 86 telescoping within the annular surface 84 of the member 80. The sleeve 85 is welded as at 87 for permanent connection to the stamping 7. A suitable spring 88 is carried within a channel shaped recess formed in the member 85 and its free end is disposed between the axially overlapping portions 86 and 84 of the members 85 and 80, respectively. The free end 89 of this spring, when the speed of the member 85 reaches a predetermined point, radially expands into frictional engagement within the surface 84, thereby locking the rotor directly to the impeller housing so that the coupling rotates as a unit and eliminates any slippage therethrough.

Considering in detail the spring 28 and also the spring 88 which is merely the spring 28 reversed, it will be noted that the spring adjacent its free end is provided with external axially directed slots 90. These slots increase the flexibility of the free end of the spring and allow its radial expansion and centrifugal action without in any way materially detracting from a full annular surface clutching engagement of the spring coils with the adjacent clutch surface. This provides what might be termed a feathering action to prevent the possibility of a shock connection, insuring that the coupling action will occur both smoothly and uniformly under the predetermined speed conditions.

I am aware that various changes may be made in certain details of the present construction and I therefore do not intend to be limited except as defined by the scope and spirit of the appended claims.

I claim:

1. A fluid coupling comprising a driving member, a driven member, a shaft driven from said driven member, a coil spring clutch carried by said driven member, an adjacent clutch surface on said driving member, and centrifugally operated means for radially expanding said clutch into engagement with said clutch surface in response to predetermined speed of rotation of said driving member.

2. In a fluid coupling including a housing driven from a source of power, an impeller element secured in said housing, a rotor element in said housing driven by said impeller, overlapping axially extending portions on said rotor and housing, and clutch means comprising a coil spring fixed to one of said elements and disposed between said overlapping portions secured to said rotor and operable to clutch said rotor and housing together for conjoint rotation, said means being responsive to predetermined speed of rotation of said rotor.

3. A fluid coupling including a rotatable housing having an impeller element, a rotor element mounted coaxially in said housing and driven from said impeller, said rotor and housing having axially overlapping cylindrical surfaces radially spaced apart to provide an annular recess therebetween, and clutch means in said recess comprising a coil spring fixed to one of said elements operable under centrifugal force of said rotor for clutching action between said surfaces to clutch said rotor and said housing together for conjoint rotation, and means for axially disassembling said clutch means from within the hub of said housing.

4. In combination a fluid coupling housing having an axially inwardly extended first sleeve in the hub thereof, a rotor journalled for rotation in said housing and having an axially directed second sleeve received within said first sleeve and radially spaced inwardly thereof, and clutch means comprising a coil spring carried on said second sleeve having one end fastened thereto, said coil spring having its other end free to expand radially in response to the speed of rotation of said rotor for clutching said housing and rotor together for conjoint rotation, said first sleeve being removable axially outwardly of said hub to provide access to said coil spring.

5. In combination a fluid coupling housing having an axially inwardly extended first sleeve in the hub thereof, a rotor journalled for rotation in said housing and having an axially directed second sleeve received within said first sleeve and radially spaced inwardly thereof, and clutch means carried on said second sleeve and rotated thereby, said clutch means comprising a coil spring fixed to said second sleeve and having an end portion free to expand radially under centrifugal force to grip said first sleeve whereby said housing and rotor are clutched together for conjoint rotation.

6. A fluid unit comprising a driving member, and a driven member, said driving and driven members having coaxially extending hub portions, and clutch means comprising a coil spring disposed within said hub portions, said coil spring being fixed to one of said members and having a free end portion adapted to expand radially under centrifugal force to clutch said members together for conjoint rotation.

7. A fluid unit comprising a driving member and a driven member, said driving and driven members having coaxially disposed hub portions, and clutch means comprising a coil spring disposed within said hub portions, said coil spring being fixed to said driven member and having a free end portion adapted to expand radially under centrifugal force to clutch said driving member to said driven member for conjoint rotation.

8. A fluid unit comprising a driving member and a driven member, said driving and driven members having coaxially extending hub portions, clutch means comprising a coil spring disposed within said hub portions with the longitudinal axis of said coil spring extending coaxially of the longitudinal axes of said hub portions, and means responsive to centrifugal force adapted to radially expand said coil spring to clutch said members together for conjoint rotation.

9. A fluid unit comprising a driving member, and a driven member, said driving and driven members having sleeve portions of different diameter arranged in overlapping relation to provide an annular recess between the external surface of the sleeve portion of the inner one of said members and the internal surface of the sleeve portion of the outer one of said members, clutch means comprising a coil spring disposed within the annular recess between the sleeve portions of said members arranged with the longitudinal axis of said coil spring coaxially of the longitudinal axes of said members, and means responsive to centrifugal force adapted to radially expand said coil spring to clutch said members together for conjoint rotation.

10. In a fluid coupling including a housing driven from a source of power, an impeller element secured in said housing, a rotor element in said housing driven by said impeller, overlapping axially extending portions on said rotor and housing, clutch means comprising a coil spring fixed to one of said elements and disposed between said overlapping portions adapted to clutch said elements together for conjoint rotation, and centrifugally actuated means carried by said housing for energizing said clutch means.

11. In a fluid coupling including a housing driven from a source of power, an impeller element secured in said housing, a rotor element in said housing driven by said impeller, overlapping axially extending portions on said rotor and housing, clutch means comprising a coil spring fixed to one of said elements and disposed between said overlapping portions adapted to clutch said elements together for conjoint rotation, a cam plate associated with said impeller, a series of circumferentially arranged balls, and means operable upon radial outward movement of said balls under centrifugal action for shifting said cam plate axially to energize said clutch means.

HARRY R. GREENLEE.